No. 686,389.　　　　　　　　　　　Patented Nov. 12, 1901.
J. M. COX.
SCREW COUPLING.
(Application filed Apr. 2, 1901.)
(No Model.)
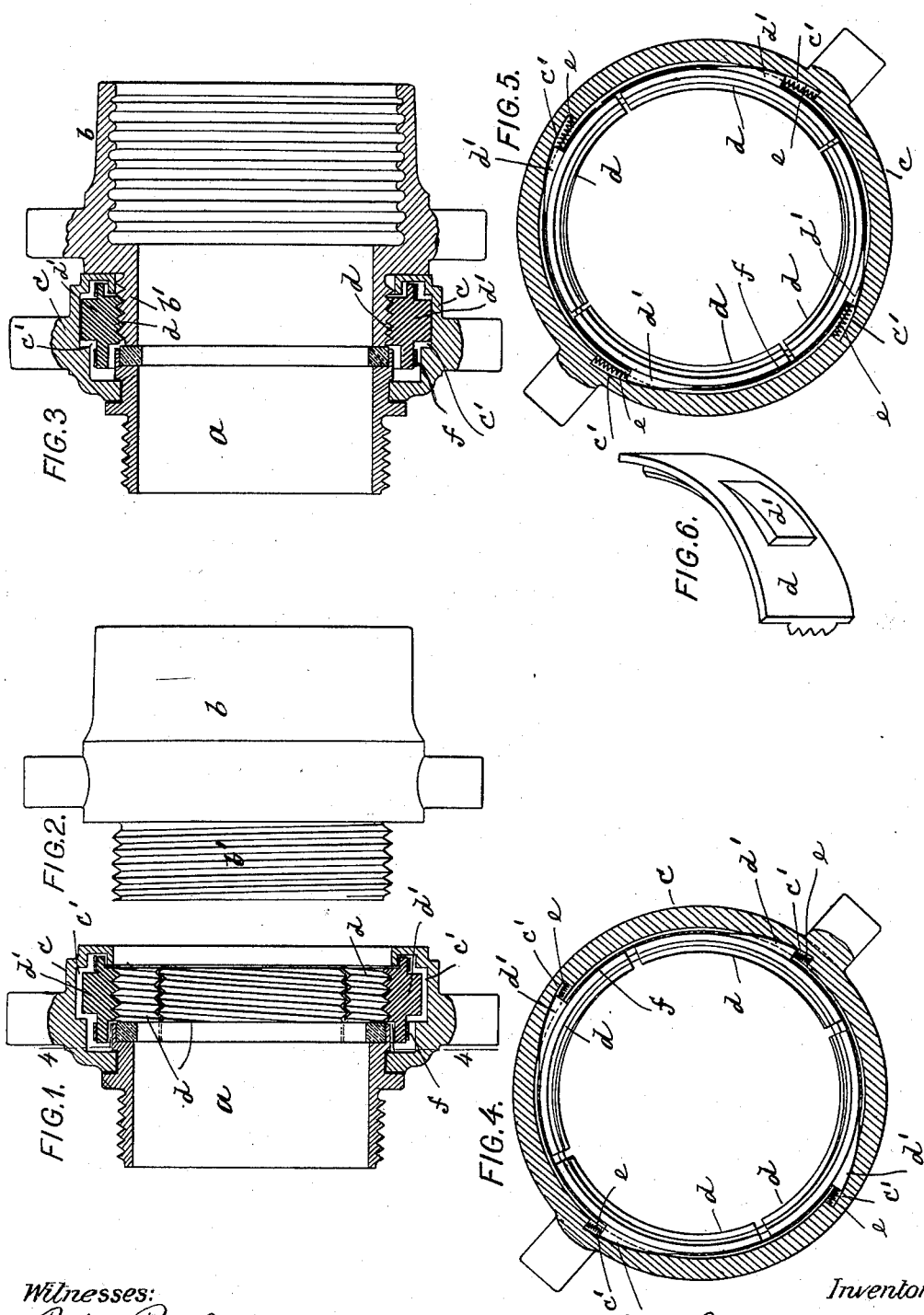
Witnesses:
John Becker,
William Schulz.
Inventor:
James M. Cox
by his attorneys
Roeder & Brieren

United States Patent Office.

JAMES M. COX, OF NEW YORK, N. Y., ASSIGNOR TO UNITED STATES COUPLER AND MANUFACTURING COMPANY, OF EAST ORANGE, NEW JERSEY, A CORPORATION OF NEW JERSEY.

SCREW-COUPLING.

SPECIFICATION forming part of Letters Patent No. 686,389, dated November 12, 1901.

Application filed April 2, 1901. Serial No. 54,033. (No model.)

*To all whom it may concern:*

Be it known that I, JAMES M. COX, a citizen of the United States, and a resident of New York city, county and State of New York, have invented certain new and useful Improvements in Screw-Couplings, of which the following is a specification.

This invention relates to a screw-coupling of the class in which the nut or female member is made expansible, so that a rapid union by an axial movement of the male member into the female member is effected.

The object of the invention is to securely interlock the parts after they have been thus preliminarily coupled, and thus prevent a separation even under excessive strain.

The invention consists in providing the expanding nut with cam-shaped projections, which upon a partial rotation of the nut will force the same radially inward and into intimate engagement with the male section.

In the accompanying drawings, Figure 1 is a longitudinal section of the female member of a hose-coupling embodying my invention; Fig. 2 is a side elevation of the male member; Fig. 3, a longitudinal section of the coupling, showing it closed; Fig. 4, a cross-section on line 4 4, Fig. 1, showing the nut expanded; Fig. 5, a similar section showing the nut contracted, and Fig. 6 a perspective view of one of the nut-sections.

The letters $a$ and $b$ represent the two members of a coupling, to which the hose or the nozzle is adapted to be attached in suitable manner. The member $a$ is provided with a rotatable collar $c$, that embraces the sections $d$ of the expanding nut. Each nut-section $d$ is provided at its outer side with a cam-shaped projection $d'$, that extends in a circumferential direction partly around such section.

The inner face of the collar $c$ is provided with a series of recesses or grooves $c'$, which have a slanting bearing-surface, so as to gradually increase in depth from end to end. These recesses are adapted to receive the cams $d'$, which are normally held in their deepest ends by weak springs $e$, so that the nut is expanded.

A band-spring $f$, slotted to clear the cams $d'$, surrounds the nut-sections $d$ and tends to contract the same against the screw $b'$ of the male member $b$ of the coupling.

After a preliminary coupling has been effected by axially thrusting the male member into the female member the collar $c$ is rotated, so that by the pressure of the projections $d'$ upon the sloping recesses $c'$ the nut-sections $d$ are crowded radially inward against the action of the springs $e$, Fig. 5, to become firmly interlocked with the screw $b'$. Thus a very reliable union is effected which will withstand even unusual strain. When the male member is unscrewed, the sections $d$ are opened by the springs $e$, ready for effecting the next coupling, Fig. 4.

In case the coupling is used to unite a hose to a nozzle the collar $c$ need not be rotatable upon the member $a$, but may be fixed, because in that case the entire member carrying the nozzle may be rotated.

Though the invention has been shown to be embodied in a hose-coupling, it is evident that it may be applied to other implements and tools in which an expanding nut is employed.

What I claim is—

1. In a screw-coupling, the combination of a collar having recesses, with a sectional nut having cam-shaped projections adapted to engage said recesses, substantially as specified.

2. In a screw-coupling, the combination of a collar having recesses, with a sectional nut having cam-shaped projections adapted to engage said recesses, a spring for contracting the nut-sections, and springs for expanding the same, substantially as specified.

Signed by me at New York city, county and State of New York, this 1st day of April, 1901.

JAMES M. COX.

Witnesses:
WILLIAM SCHULZ,
F. V. BRIESEN.